April 20, 1943.  C. J. SCHAFER  2,317,089
FEEDING MECHANISM FOR SHAKER CONVEYERS
Filed Sept. 19, 1941   2 Sheets-Sheet 1
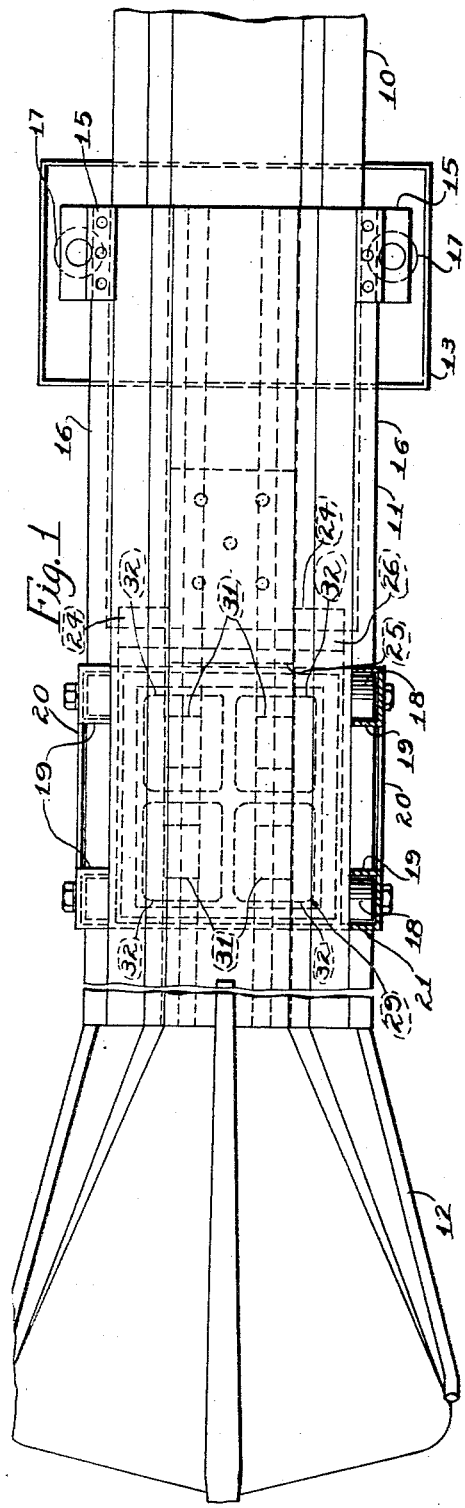
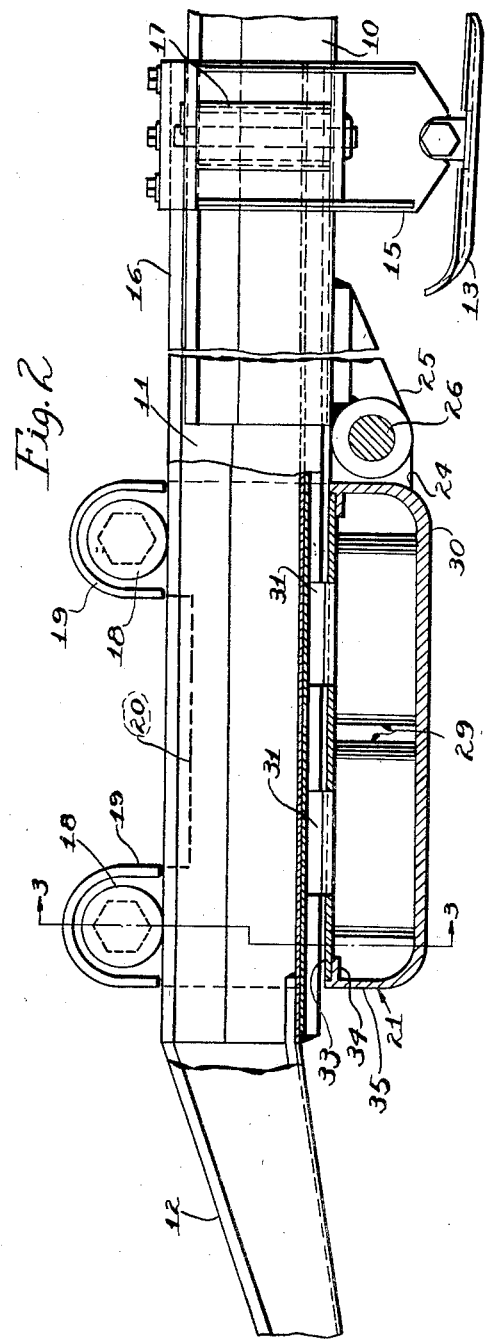
INVENTOR.
Charles J. Schafer
BY
Clarence F. Poole
ATTY.

April 20, 1943.  C. J. SCHAFER  2,317,089

FEEDING MECHANISM FOR SHAKER CONVEYERS

Filed Sept. 19, 1941  2 Sheets-Sheet 2

INVENTOR.
Charles J. Schafer
BY
Clarence F. Poole
ATTY.

Patented Apr. 20, 1943

2,317,089

UNITED STATES PATENT OFFICE 2,317,089

FEEDING MECHANISM FOR SHAKER CONVEYERS

Charles J. Schafer, Denver, Colo., assignor to Goodman Manufacturing Company, Chicago, Ill., a corporation of Illinois Application September 19, 1941, Serial No. 411,545

13 Claims. (Cl. 198—220)

This invention relates to improvements in feeding mechanisms for shaker conveyers of the type utilized for picking up and transporting loose material such as coal, rock, or the like.

More specifically, my invention relates to an automatic feeding mechanism for a reciprocating conveyer and has as its principal objects to provide a novel automatic feeding means for an extensible trough section of a shaker conveyer including an electrical magnetic circuit together with means for energizing said magnetic circuit during certain strokes of the conveyer.

Other objects of my invention will appear from time to time as the following specification proceeds and with reference to the accompanying drawings wherein:

Figure 1 is a top plan view of the receiving end of a shaker conveyer trough line, showing a magnetic feeding mechanism constructed in accordance with my invention for feeding an extensible trough section of a shaker conveyer with respect to a reciprocating trough section of the conveyer trough line;

Figure 2 is a view in side elevation of the device shown in Figure 1, with certain parts shown in longitudinal section;

Figure 3:
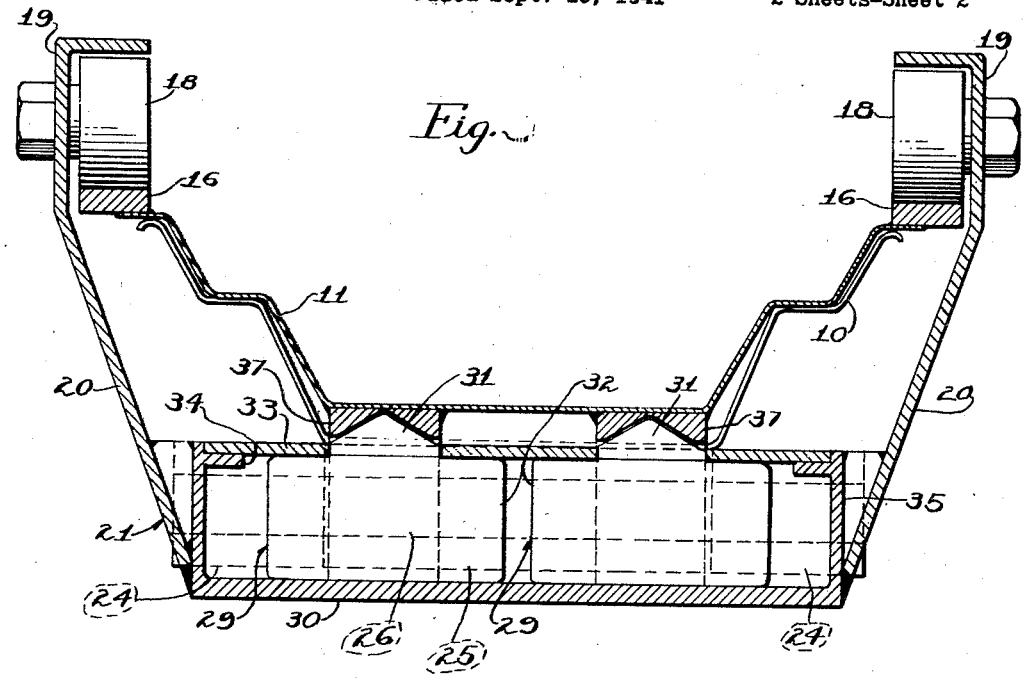
Figure 3 is a fragmentary transverse sectional view taken substantially along line 3—3 of Figure 1.

In the drawings, the main elements of the embodiment of the invention illustrated consist of a reciprocating trough section 10 connected to the forward end of a shaker conveyer trough line (not shown) and an extensible trough section 11 mounted for telescopic movement with respect to said reciprocating trough section and having a flared gathering shovel 12 at its forward end.

The extensible trough section 11 is supported for reciprocable movement along the ground on the shovel 12 at its forward end and is supported at its rearward end on a shoe 13, mounted for slidable engagement with the ground. Said shoe, as herein shown, is transversely pivoted to the lower ends of a pair of laterally spaced support brackets 15, 15 extending upwardly along opposite sides of the reciprocating trough section 10. Said support brackets are secured at their upper ends to bearing plates 16, 16 extending along the upper flanges of said extensible trough section. Vertical rollers 17, 17, are mounted in said support brackets and have rolling engagement with the outer sides of said reciprocating trough section, to aid in maintaining said extensible trough section in alignment with said reciprocating trough section.

The forward end of the reciprocating trough section 10 is supported and guided for reciprocable movement along the extensible trough section 11 on a plurality of laterally and longitudinally spaced rollers 18, 18, mounted in bracket members 19, 19 projecting upwardly from opposite side walls 20, 20 of a feeding frame 21. Said rollers are adapted to ride along the upper sides of the bearing plates 16, 16 and form a rolling support for said feeding frame and the forward end of said reciprocating trough section on said extensible trough section.

The feeding frame 21 is provided with laterally spaced rearwardly projecting hinge members 24, 24, extending along opposite sides of a hinge member 25, which projects forwardly from the reciprocating trough section 10. A transverse hinge pin pivotally connects said hinge members together (see Figure 2).

Referring now in particular to the novel means for extending or retracting the extensible trough section 11 with respect to the reciprocating trough section 10, a plurality of electrical magnets 29, 29 are mounted in a bottom portion 30 of the feeding frame 21. Said magnets may be of any usual form and each includes a core 31 mounted on and projecting upwardly from the bottom of said bottom portion and having a coil 32 mounted thereon. As herein shown, two pairs of magnets are provided, one magnet in each pair being polarized oppositely from the next adjacent magnet of the same pair, to cause a magnetic circuit to flow from one of said magnets into the other. Said coils are held in position by means of a retaining plate 33, secured to the upper sides of a flange 34, extending around side walls 35 of said bottom portion of said feeding frame. Said retaining plate has openings therein, to permit the cores 31, 31 of said magnets to pass therethrough. Said retaining plate is preferably made from brass, to break up any magnetic flux in the frame 21 and to permit a magnetic circuit to flow outwardly through one core 31 and downwardly into the next adjoining core 31.

A pair of laterally spaced shoes 37, 37 are secured to the bottom of the extensible section 11 and extend longitudinally therealong. Said shoes may be made from either iron or steel and the bottom faces thereof are herein shown as being of a V-shaped formation opening towards the ground. Said V-shaped bottom faces of said shoes are adapted to receive the upper ends of the cores 31, 31 of said magnets. Said V-shaped bottom faces of said shoes and said corresponding upper ends of said cores thus increase the attractive surface of the cores of said magnets and enable the thickness and area of said shoes to be smaller than if the upper faces of said cores were flat.

It may be seen from the foregoing that when the magnets 29, 29 are energized they will attract the shoes 37, 37 and move the extensible trough section 11 with the reciprocating trough section 10, upon reciprocation of the conveyer. When said magnets are deenergized, the reciprocating trough section will move along the extensible trough section. Thus, extension of the extensible trough section may be effected by energizing the magnets 29, 29 upon the forward stroke of the conveyer and deenergizing these magnets upon the return stroke of the conveyer, and retraction of the extensible trough section with respect to the reciprocating trough section may be effected by energizing the magnets 29, 29 upon the return stroke of the conveyer and deenergizing said magnets upon the forward stroke of the conveyer.

Figure 4:
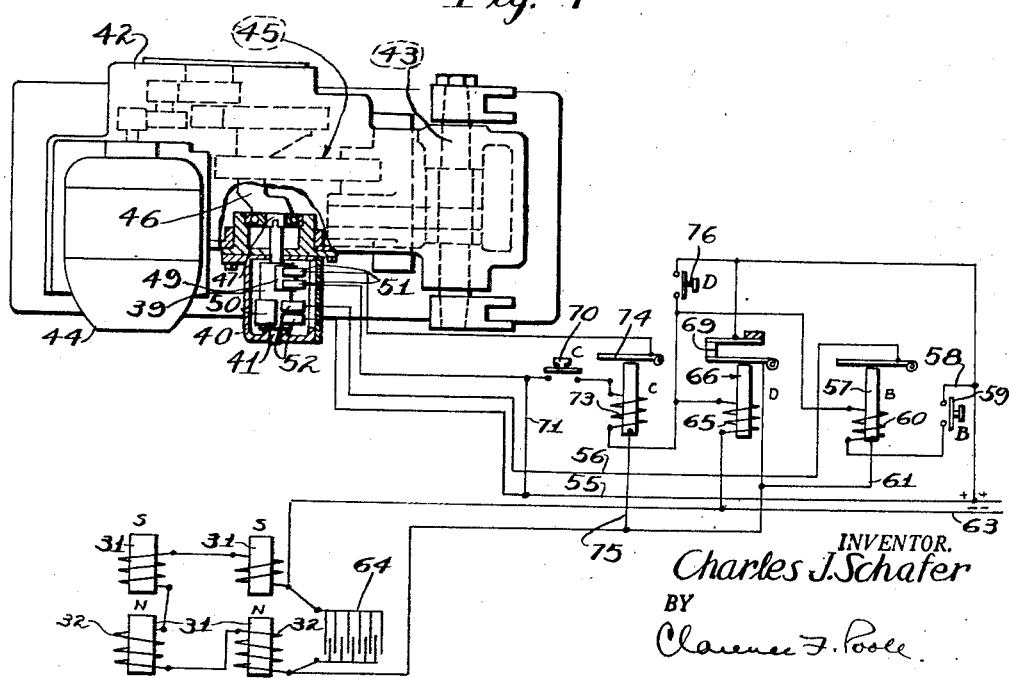
Figure 4 is a diagrammatic view illustrating the electrical controlling connections to the feeding magnets.

Referring now to Figure 4 and the electrical control means for alternately energizing and deenergizing the electrical magnets 29, 29, during the forward and return strokes of the conveyer, or vice versa, depending upon whether it is desired to extend or retract the extensible trough section, a control drum 39 is rotatably mounted in a casing 40 on a shaft 41. Said casing is suitably mounted on the outside of a casing for a shaker conveyer drive mechanism, which is generally indicated by reference character 42.

The drive mechanism 42 may be of any type well known to those skilled in the art, and as herein shown includes a transversely extending rock shaft 43 forming a drive shaft for reciprocably driving a shaker conveyer trough line (not shown). Said drive shaft is reciprocably driven by a motor 44 through a gear train and crank and linkage connection generally indicated by reference character 45, which includes a rotatably driven crank 46, which, as herein shown, forms a means for rotatably driving the drum 39.

One end of the shaft 41 for the drum 39, projects beyond the casing 40 and has engagement with a socket 47 on the outer end of the crank shaft 43, for rotatably driving said drum shaft and control drum. Said control drum is provided with a pair of spaced contacts 49 and 50. Said contacts are so arranged that upon rotation thereof, the contact 49 will make the electrical connection between contact fingers 51, 51 on one stroke of the conveyer, and the contact 50 will make the electrical connection between contact fingers 52, 52 upon the opposite stroke of the conveyer.

The controlling connection between the contacts 49 and 50 and the magnets 29, 29 includes a positive conductor 55, leading to one contact finger 52. When said contact finger is in engagement with the contact 50, the circuit between said contact fingers is closed and current is conducted from the other contact finger 52 through a conductor 56 to a contactor 57. Current also passes from the conductor 55 through a conductor 58 to a switch 59, herein shown as being a push button switch. When said push button switch is closed, a coil 60 of the contactor 57 will be energized to close the circuit through said contactor and to permit current to flow from said contactor through a conductor 61 to the coils 32, 32 of the magnets 29 and through a conductor 63, to ground, to energize said magnets. A condenser 64 is shunted across the coils 32, 32 to take care of current surges during the breaking of the circuit to said coils.

When the push button switch 59 is closed, current will also flow through a coil 65 of a relay 66, to open said relay. The push button 59 is so arranged that manual pressure must be continually exerted against said button to hold it in a closed position, and when pressure is released from said button, the circuits to the coils 60 and 65 will be broken, which will open the contactor 57 and permit the relay 66 to close. The closing of said relay and the opening of the contactor 57 will cause current to pass through contacts 69 of the relay 66, to the conductor 61, through the coils 32, 32 of magnets 29, to ground, to energize said magnets during both the forward and return strokes of the conveyer, and to cause said magnets to reciprocably move the extensible trough section 11 with the reciprocating trough section 10.

When manual pressure is relieved from the push button 59, to open the circuit thereto, and manual pressure is applied to a push button 70, current will pass from the conductor 55 through a conductor 71, through said push button, to and through a coil 73 of a contactor 74 and the coil 65 of the relay 66, to ground, to energize said coils and close said contactor and open the contacts of said relay.

When the contactor 74 is closed, current will pass from the conductor 71, through one contact finger 51, to the contact 49, through the other contact finger 51, through the contacts of the contactor 74, through a conductor 75 to the conductor 61, and through the coils 32, 32 of the magnets 29 to ground, to energize said magnets. At this time no current flows through the contact fingers 52, 52, and the contact 49 will be engaged with the contact fingers 51, 51 during the stroke of the conveyer opposite from the stroke that engages the contact 50 with the contact fingers 52, 52, to make and break the circuit to the magnets 29, 29 during alternate strokes of the conveyer, and to cause the extensible trough section 11 and shovel 12 to be moved in an opposite direction than when the push button 59 is closed and the push button 70 is open.

When it is desired to deenergize the coils 32, 32 during the forward and return strokes of the conveyer, to permit the reciprocating trough section to reciprocable move along the extensible trough section, a push button switch 76 is closed, the push button switches 70 and 59 being open. Current will pass from the conductor 55, through said switch and through the coil 65 of the relay 66 to ground, to energize said coil and open said relay and thus open the circuit to the coils 32, 32.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a feeding device for shaker conveyers, a reciprocating trough section, an extensible trough section, and means for moving said extensible trough section relative to said reciprocating trough section including an electric magnet adapted to be selectively energized during certain strokes of the conveyer to attract and cause movement of said extensible trough section with respect to said reciprocating trough section.

2. In a feeding device for shaker conveyers, a reciprocating trough section, an extensible trough section, and means for moving said extensible trough section relative to said reciprocating trough section including an electric magnet, and means selectively operable to make and break the circuit to said magnet during certain strokes of the conveyer to cause said magnet to alternately attract and be released from said extensible trough section during opposite strokes of the conveyer, to extend or retract said extensible trough section with respect to said reciprocating trough section.

3. In a feeding device for shaker conveyers, a reciprocating trough section, an extensible trough section, and means for moving said extensible trough section relative to said reciprocating trough section including an electric magnet, a power circuit for energizing said magnet, means for manually opeing or closing said circuit, and other means for alternately making and breaking said circuit during certain strokes of the conveyer, to cause said magnet to alternately attract and be released from one trough section of the conveyer during opposite strokes of the conveyer, to cause movement of one trough section of the conveyer with respect to the other.

4. In a feeding device for shaker conveyers, a reciprocating trough section, an extensible trough section, and means for moving said extensible trough section relative to said reciprocating trough section including an electric magnet, a power circuit for energizing said magnet, means for manually opening or closing said circuit, and other means operated by the shaker conveyer upon reciprocation thereof, for alternately making and breaking said circuit during certain strokes of the conveyer to cause said magnet to alternately attract and release said extensible trough section, to extend or retract said extensible trough section with respect to said reciprocating trough section.

5. In a feeding device for shaker conveyers, a reciprocating trough section, drive mechanism for reciprocably driving said reciprocating trough section, an extensible trough section mounted for telescopic movement with respect to said reciprocating trough section, and an electric magnet connected with one of said trough sections and adapted to selectively attract and be released from said other trough section, for extending or retracting said extensible trough section with respect to said reciprocating trough section.

6. In a feeding device for shaker conveyers, a reciprocating trough section, drive mechanism for reciprocably driving said reciprocating trough section, an extensible trough section mounted for telescopic movement with respect to said reciprocating trough section, an electric magnet connected with one of said trough sections and adapted to selectively attract and be released from said other trough section, for extending or retracting said extensible trough section with respect to said reciprocating trough section, an electric power circuit for energizing said magnet, and electrical control means connected in said circuit and operated by said shaker conveyer drive mechanism, for making and breaking the circuit to said magnet during certain strokes of the conveyer.

7. In a feeding device for shaker conveyers, a reciprocating trough section, drive mechanism for reciprocably driving said reciprocating trough section, an extensible trough section mounted for telescopic movement with respect to said reciprocating trough section, and an electric magnet having connection with said reciprocating trough section and adapted to selectively attract and be released from said extensible trough section, for moving said extensible trough section with said magnet during certain strokes of the conveyer and extending or retracting said extensible trough section with respect to said reciprocating trough section, an electric power circuit for energizing said magnet, and electrical control means connected in said power circuit and operated by said shaker conveyer drive mechanism, for making and breaking the circuit to said magnet during certain strokes of the conveyer.

8. In a feeding device for shaker conveyers, a reciprocating trough section, drive mechanism for reciprocably driving said reciprocating trough section, an extensible trough section mounted for telescopic movement with respect to said reciprocating trough section, an electric magnet connected with one of said trough sections and adapted to selectively attract and be released from said other trough section, for extending or retracting said extensible trough section with respect to said reciprocating trough section, an electric power circuit for energizing said magnet, and electrical control means connected in said circuit and operated by said shaker conveyer drive mechanism, for making and breaking the circuit to said magnet during certain strokes of the conveyer, and manually operable means to cause said control means to selectively energize said magnet during either the forward or return strokes of the conveyer and to permit said magnet to be deenergized during the opposite strokes of the conveyer.

9. In a feeding device for shaker conveyers, a reciprocating trough section, an extensible trough section mounted for telescopic movement with respect to said reciprocating trough section, means for telescopically extending or retracting said extensible trough section with respect to said reciprocating trough section including an electric magnet transversely pivoted to said reciprocating trough section and projecting forwardly therefrom, and electrical control means for energizing said magnet to cause said magnet to attract said extensible trough section during certain strokes of the conveyer.

10. In a feeding device for shaker conveyers, a reciprocating trough section, an extensible trough section mounted for telescopic movement with respect to said reciprocating trough section, and means for telescopically extending or retracting said extensible trough section with respect to said reciprocating trough section including a frame transversely pivoted to said reciprocating trough section and projecting forwardly therefrom and slidably supported on said extensible trough section, an electric magnet carried by said frame and electrical control connections to said magnet selectively operable to alternately energize and deenergize said magnet during certain strokes of the conveyer.

11. In a feeding device for shaker conveyers, a reciprocating trough section, an extensible trough section mounted for telescopic movement with respect to said reciprocating trough section, and means for telescopically extending or retracting said extensible trough section with respect to said reciprocating trough section including a frame transversely pivoted to said reciprocating trough section and projecting forwardly therefrom and slidably supported on said extensible trough section, an electric magnet carried by said frame, electrical control connections to said magnet selectively operable to alternately energize and deenergize said magnet during certain strokes of the conveyer, and a shoe extending along the bottom of said extensible trough section and adapted to be attracted by said magnet, said shoe having a V-shaped face opening towards the ground, and the core of said magnet being correspondingly formed and adapted to extend within the "V" of said shoe.

12. In a feeding device for shaker conveyers, a reciprocating trough section, an extensible trough section mounted for telescopic movement with respect to said reciprocating trough section, and means for telescopically extending or retracting said extensible trough section with respect to said reciprocating trough section including a plurality of electric magnets of unlike poles arranged side by side, and electrical control connections to said magnets to cause said magnets to attract one of said trough sections to cause said trough sections to move together or to be released from said trough section to permit one to move with respect to the other.

13. In a feeding device for shaker conveyers, a reciprocating trough section, an extensible trough section mounted for telescopic movement with respect to said reciprocating trough section, and means for telescopically extending or retracting said extensible trough section with respect to said reciprocating trough section including a frame transversely pivoted to one trough section of the conveyer and slidably supported on said other trough section, a plurality of electric magnets carried by said frame, and electrical control connections to said magnets selectively operable to alternately energize and deenergize said magnets during certain strokes of the conveyer, to cause said magnets to attract and be released from said other trough section.

CHARLES J. SCHAFER.